United States Patent
Strack et al.

(10) Patent No.: US 7,272,503 B2
(45) Date of Patent: Sep. 18, 2007

(54) METHOD AND APPARATUS FOR MEASURING FORMATION CONDUCTIVITIES FROM WITHIN CASED WELLBORES BY COMBINED MEASUREMENT OF CASING CURRENT LEAKAGE AND ELECTROMAGNETIC RESPONSE

(75) Inventors: Kurt M. Strack, Houston, TX (US); Horst Rueter, Dortmund (DE)

(73) Assignee: KJT Enterprises, Inc., Houston, TX (US)

( * ) Notice: Subject to any disclaimer, the term of this patent is extended or adjusted under 35 U.S.C. 154(b) by 0 days.

(21) Appl. No.: 11/586,917

(22) Filed: Oct. 26, 2006

(65) Prior Publication Data
US 2007/0168134 A1   Jul. 19, 2007

Related U.S. Application Data

(62) Division of application No. 10/912,588, filed on Aug. 5, 2004, now Pat. No. 7,202,671.

(51) Int. Cl.
*G01V 3/18* (2006.01)
*G01V 3/20* (2006.01)

(52) U.S. Cl. .......................................... 702/7; 324/370

(58) Field of Classification Search ................... 702/7; 324/347, 370, 355
See application file for complete search history.

(56) References Cited

U.S. PATENT DOCUMENTS

| | | | | |
|---|---|---|---|---|
| 5,608,323 | A | * | 3/1997 | Koelman ..................... 324/368 |
| 6,541,975 | B2 | * | 4/2003 | Strack ........................ 324/323 |

* cited by examiner

*Primary Examiner*—D. McElheny, Jr.
(74) *Attorney, Agent, or Firm*—Richard A Fagin

(57) ABSTRACT

A method for determining spatial distribution of resistivity of Earth formations surrounding a wellbore having a conductive pipe therein includes measuring resistivity of the Earth formations using measurements of current leakage along the pipe at selected axial positions. Electromagnetic properties of the Earth formations are measured from within the pipe. The measurements of electromagnetic properties correspond to a larger axial distance and to a greater lateral distance than the measurements of resistivity from current leakage. The current leakage and electromagnetic measurements are jointly inverted to obtain a model of the spatial distribution.

21 Claims, 10 Drawing Sheets

METHOD AND APPARATUS FOR MEASURING FORMATION CONDUCTIVITIES FROM WITHIN CASED WELLBORES BY COMBINED MEASUREMENT OF CASING CURRENT LEAKAGE AND ELECTROMAGNETIC RESPONSE

CROSS-REFERENCE TO RELATED APPLICATIONS

Division of Ser. No. 10/912,588 filed on Aug. 5, 2004 now U.S. Pat. No. 7,202,671.

STATEMENT REGARDING FEDERALLY SPONSORED RESEARCH OR DEVELOPMENT

Not applicable.

BACKGROUND OF INVENTION

1. Field of the Invention

The invention relates generally to the field of Earth formation electrical resistivity measuring devices. More particularly, the invention relates to wellbore instruments for measuring formation resistivity from within an electrically conductive pipe or casing including a moving while measuring apparatus and method.

2. Background Art

Electrical resistivity measurements of Earth formations are known in the art for determining properties of the measured Earth formations. Properties of interest include the fluid content of the pore spaces of the Earth formations. Wellbore resistivity measuring devices known in the art typically require that the Earth formations be exposed by drilling a wellbore therethrough, and that such formations remain exposed to the wellbore so that the measurements may be made from within the exposed formations.

When wellbores are completely drilled through the Earth formations of interest, frequently a steel pipe or casing is inserted into and cemented in place within the wellbore to protect the Earth formations, to prevent hydraulic communication between subsurface Earth formations, and to provide mechanical integrity to the wellbore. Steel casing is highly electrically conductive, and as a result makes it difficult to use conventional (so called "open hole") techniques to determine the resistivity of the various Earth formations from within a steel pipe or casing.

It is known in the art to make measurements for determining the electrical resistivity of Earth formations from within conductive casing or pipe. A number of references disclose techniques for making such measurements. A list of references which disclose various apparatus and methods for determining resistivity of Earth formations from within conductive casings includes: USSR inventor certificate no. 56052, filed by Alpin, L. M. (1939), entitled, *The method for logging in cased wells*; USSR inventor certificate no. 56026, filed by Alpin, L. M. (1939), entitled, *Process of the electrical measurement of well casing*; U.S. Pat. No. 2,459,196, to Stewart, W. H. (1949), entitled, *Electrical logging method and apparatus*; U.S. Pat. No. 2,729,784 issued to Fearon, R. E. (1956), entitled, *Method and apparatus for electric well logging*, U.S. Pat. No. 2,891,215 issued to Fearon, R. E. (1959), entitled, *Method and apparatus for electric well logging*; French patent application no. 72.41218, filed by Desbrandes, R. and Mengez, P. (1972), entitled, *Method & Apparatus for measuring the formation electrical resistivity in wells having metal casing*; International Patent Application Publication no. WO 00/79307 A1, filed by Benimeli, D. (2002), entitled, *A method and apparatus for determining of a formation surrounding a cased well*; U.S. Pat. No. 4,796,186 issued to Kaufman, A. A. (1989), entitled, *Conductivity determination in a formation having a cased well*; U.S. Pat. No. 4,820,989, issued to Vail, III, W. (1989), entitled, *Methods and apparatus for measurement of the resistivity of geological formation from within cased boreholes*; U.S. Pat. No. 4,837,518 issued to Gard et al. (1989), entitled, *Method and Apparatus for measuring the electrical resistivity of formation through metal drill pipe or casing*; U.S. Pat. No. 4,882,542 issued to Vail, III, W. (1989), entitled, *Methods and apparatus for measurement of electronic properties of geological formations through borehole casing*; U.S. Pat. No. 5,043,668 issued to Vail, III, W. (1991), entitled, *Methods and apparatus for measurement of electronic properties of geological formations through borehole casing*; U.S. Pat. No. 5,075,626 issued to Vail, III, W. (1991), entitled, *Electronic measurement apparatus movable in a cased borehole and compensation for casing resistance differences*; U.S. Pat. No. 5,223,794 issued to Vail, III, W. (1993), entitled, *Methods of apparatus measuring formation resistivity from within a cased well having one measurement and two compensation steps*; U.S. Pat. No. 5,510,712 issued to Sezginer et al. (1996), entitled, *Method and apparatus for measuring formation resistivity in cased holes*; U.S. Pat. No. 5,543,715 issued to Singer et al. (1996), entitled, *Method and apparatus for measuring formation resistivity through casing using single-conductor electrical logging cable*; U.S. Pat. No. 5,563,514 issued to Moulin (1996), entitled, *Method and apparatus for determining formation resistivity in a cased well using three electrodes arranged in a Wheatstone bridge*. U.S. Pat. No. 5,654,639 issued to Locatelli et al. (1997), entitled, *Induction measuring device in the presence of metal walls*; U.S. Pat. No. 5,570,024 issued to Vail, III, W. (1996), entitled, *Determining resistivity of a formation adjacent to a borehole having casing using multiple electrodes and resistances being defined between the electrodes*; U.S. Pat. No. 5,608,323 issued to Koelman, J. M. V. A. (1997), entitled, *Arrangement of the electrodes for an electrical logging system for determining the electrical resistivity of subsurface formation*; U.S. Pat. No. 5,633,590 issued to Vail, III, W. (1997), entitled, *Formation resistivity measurements from within a cased well used to quantitatively determine the amount of oil and gas present*. U.S. Pat. No. 5,680,049 issued to Gissler et al. (1997), entitled, *Apparatus for measuring formation resistivity through casing having a coaxial tubing inserted therein*; U.S. Pat. No. 5,809,458 issued to Tamarchenko (1998), entitled, *Method of simulating the response of a through-casing resistivity well logging instrument and its application to determining resistivity of earth formations*; U.S. Pat. No. 6,025,721 issued to Vail, III, W. (2000), entitled, *Determining resistivity of a formation adjacent to a borehole having casing by generating constant current flow in portion of casing and using at least two voltage measurement electrodes*; U.S. Pat. No. 6,157,195 issued to Vail, III, W. (2000), entitled, *Formation resistivity measurements from within a cased well used to quantitatively determine the amount of oil and gas present*; U.S. Pat. No. 6,246,240 B1 issued to Vail, III, W. (2001), entitled, *Determining resistivity of formation adjacent to a borehole having casing with an apparatus having all current conducting electrodes within the cased well*; U.S. Pat. No. 6,603,314 issued to Kostelnicek et al. (2003), entitled, *Simultaneous current injection for measurement of formation resistance through casing*; and U.S. Pat. No.

6,667,621 issued to Benimelli, entitled, *Method and apparatus for determining the resistivity of a formation surrounding a cased well.*

United States patent application Publications which cite relevant art include no. 2001/0033164 A1, filed by Vinegar et al., entitled, *Focused through-casing resistivity measurement*; no. 2001/0038287 A1, filed by Amini, Bijan K., entitled, *Logging tool for measurement of resistivity through casing using metallic transparencies and magnetic lensing*; no. 2002/0105333 A1 filed by Amini, Bijan K., entitled, *Measurements of electrical properties through non magnetically permeable metals using directed magnetic beams and magnetic lenses*. and no. 2003/0042016 A1, filed by Vinegar et al., entitled, *Wireless communication using well casing*

The foregoing techniques are summarized briefly below. U.S. Pat. No. 2,459,196 describes a method for measuring inside a cased wellbore, whereby electrical current is caused to flow along the conductive casing such that some of the current will "leak" into the surrounding Earth formations. The amount of current leakage is related to the electrical conductivity of the Earth formations. The '196 patent does not disclose any technique for correcting the measurements for electrical inhomogeneities in the casing.

U.S. Pat. No. 2,729,784 discloses a technique in which three potential electrodes are used to create two opposed pairs of electrodes in contact with a wellbore casing. Electrical current is caused to flow in two opposing "loops" through two pairs of current electrodes placed above and below the potential electrodes such that electrical inhomogeneities in the casing have their effect nulled. Voltage drop across the two electrode pairs is related to the leakage current into the Earth formations. The disclosure in U.S. Pat. No. 2,891,215 includes a current emitter electrode disposed between the measuring electrodes of the apparatus disclosed in the '784 patent to provide a technique for fully compensating the leakage current.

U.S. Pat. No. 4,796,186 discloses the technique most frequently used to determine resistivity through conductive casing, and includes measuring leakage current into the Earth formations, and discloses measuring current flowing along the same portion of casing in which the leakage current is measured so as to compensate the measurements of leakage current for changes in resistance along the casing. Other references describe various extensions and improvements to the basic techniques of resistivity measurement through casing.

The methods known in the art for measuring resistivity through casing can be summarized as follows. An instrument is lowered into the wellbore having at least one electrode on the instrument (A) which is placed into contact with the casing at various depths in the casing. A casing current return electrode B is disposed at the top of and connected to the casing. A formation current return electrode B* is disposed at the Earth's surface at some distance from the wellbore. A record is made of the voltage drop and current flowing from electrode A in the wellbore at various depths, first to electrode B at the top of the casing and then to formation return electrode B*. Current flow and voltage drop through the casing (A-B) is used to correct measurements of voltage drop and current flow through the formation (A-B*) for effects of inhomogeneity in the casing.

If the Earth and the casing were both homogeneous, a record with respect to depth of the voltage drop along the casing, and the voltage drop through the casing and formation, would be substantially linear. As is well known in the art, casing includes inhomogeneities, even when new, resulting from construction tolerances, composition tolerances, and even "collars" (threaded couplings) used to connect segments of the casing to each other. Earth formations, of course, are not at all homogeneous, and more resistive formations are typically the object of subsurface investigation, because these Earth formations tend to be associated with presence of petroleum, while the more conductive formations tend to be associated with the presence of all connate water in the pore spaces. Therefore, it is the perturbations in the record of voltage drop with respect to depth that are of interest in determining resistivity of Earth formations outside casing using the techniques known in the art.

The conductivity of the Earth formations is related to the amount of current leaking out of the casing into the formations. The formation conductivity with respect to depth is generally related to the second derivative of the voltage drop along A-B with respect to depth, when current is flowing between A and B*. Typically, the second derivative of the voltage drop is measured using a minimum of three axially spaced apart electrodes placed in contact with the casing, coupled to cascaded differential amplifiers, ultimately coupled to a voltage measuring circuit. Improvements to the basic method that have proven useful include systems which create s small axial zone along the casing in which substantially no current flows along the casing itself to reduce the effects of casing inhomogeneity on the measurements of leakage current voltage drop.

In practice, instruments and methods known in the art require that the instrument make its measurements from a fixed position within the wellbore, which makes measuring formations of interest penetrated by a typical wellbore take an extensive amount of time. Further, the voltage drops being measured are small, and thus subject to noise limitations of the electronic systems used to make the measurements of voltage drop. Still further, systems known in the art for providing no-current zones, or known current flow values for measurements of voltage drop, are typically analog systems, and thus subject to the accuracy limitations of such analog systems.

Still further, it is known in the art to use low frequency alternating current (AC) to induce current flow along the casing and in the Earth formations. AC is used to avoid error resulting from electrical polarization of the casing and the electrodes when continuous direct current (DC) is used. Typically, the frequency of the AC must be limited to about 0.01 to 20 Hz to avoid error in the measurements caused by dielectric effects and the skin effect. It is also known in the art to use polarity-switched DC to make through casing resistivity measurements, which avoids the polarization problem, but may induce transient effect error in the measurements when the DC polarity is switched. Transient effects, and low frequency AC errors are not easily accounted for using systems known in the art.

Lastly, it is known in the art to simulate response of a through-casing resistivity measuring instrument. See, for example, U.S. Pat. No. 5,809,458 issued to Tamarchenko (1998), entitled, *Method of simulating the response of a through-casing resistivity well logging instrument and its application to determining resistivity of earth formations*. In a process for determining resistivity of formations from within a conductive pipe or casing as disclosed in the Tamarchenko '458 patent, an initial model of Earth formations is made, and the expected response of a resistivity measurement device is simulated. The simulated response is compared to the response actually measured by the instrument. The model is adjusted, and the simulation and comparison are repeated until differences between the simulated response and the measured response reach a minimum. When the differences reach a minimum, the model extant at that point is determined to represent the spatial distribution of resistivities in the Earth surrounding the conductive pipe or casing. While the method of the '458 patent is effective, it can be computationally intensive to perform, because voltage measurements from the resistivity measurement systems known in the art for measuring resistivity from within a conductive casing are extremely complex, and the number of possible Earth models which can be consistent with the measured response may cause initializing the Earth model to be time consuming. What is needed is an instrument for measuring resistivity through a conductive pipe or casing that includes measurements capable of efficiently constraining the initial Earth model so that subsequent inversion processing more quickly converges on a solution model.

SUMMARY OF THE INVENTION

One aspect of the invention is an instrument for measuring formation resistivity through a conductive pipe in a wellbore. The instrument a plurality of housings connected end to end, the housings adapted to traverse the wellbore. At least one electrode is disposed on each housing. Each electrode is adapted to be placed in electrical contact with the inside of the pipe. The instrument includes a source of electrical current; a digital voltage measuring circuit; and a switch. The switch is arranged to connect the source of electrical current between one of the electrodes and a current return at a selectable one of the top of the pipe and a location near the Earth's surface at a selected distance from the top of the pipe. The switch is also arranged to connect selected pairs of the electrodes to the digital voltage measuring circuit. The pairs are selected to make voltage measurements corresponding to selected axial distances and selected lateral depths in the Earth formations. Within at least one of the housings is disposed at least one electromagnetic transmitter, at least one electromagnetic receiver and a control circuit adapted to selectively energize the at least one transmitted and to detect signals from the at least one electromagnetic receiver.

Another aspect of the invention is a method for determining spatial distribution of resistivity of Earth formations surrounding a wellbore having a conductive pipe therein. The method includes measuring resistivity of the Earth formations using measurements of current leakage along the pipe at selected axial positions. Electromagnetic properties of the Earth formations are measured from within the pipe. The measurements of electromagnetic properties correspond to a larger axial distance and to a greater lateral distance than the measurements of resistivity from current leakage. The current leakage and electromagnetic measurements are jointly inverted to obtain a model of the spatial distribution. The combination enables a slow moving of the measurement apparatus.

Other aspects and advantages of the invention will be apparent from the following description and the appended claims.

DETAILED DESCRIPTION

Figure 1:
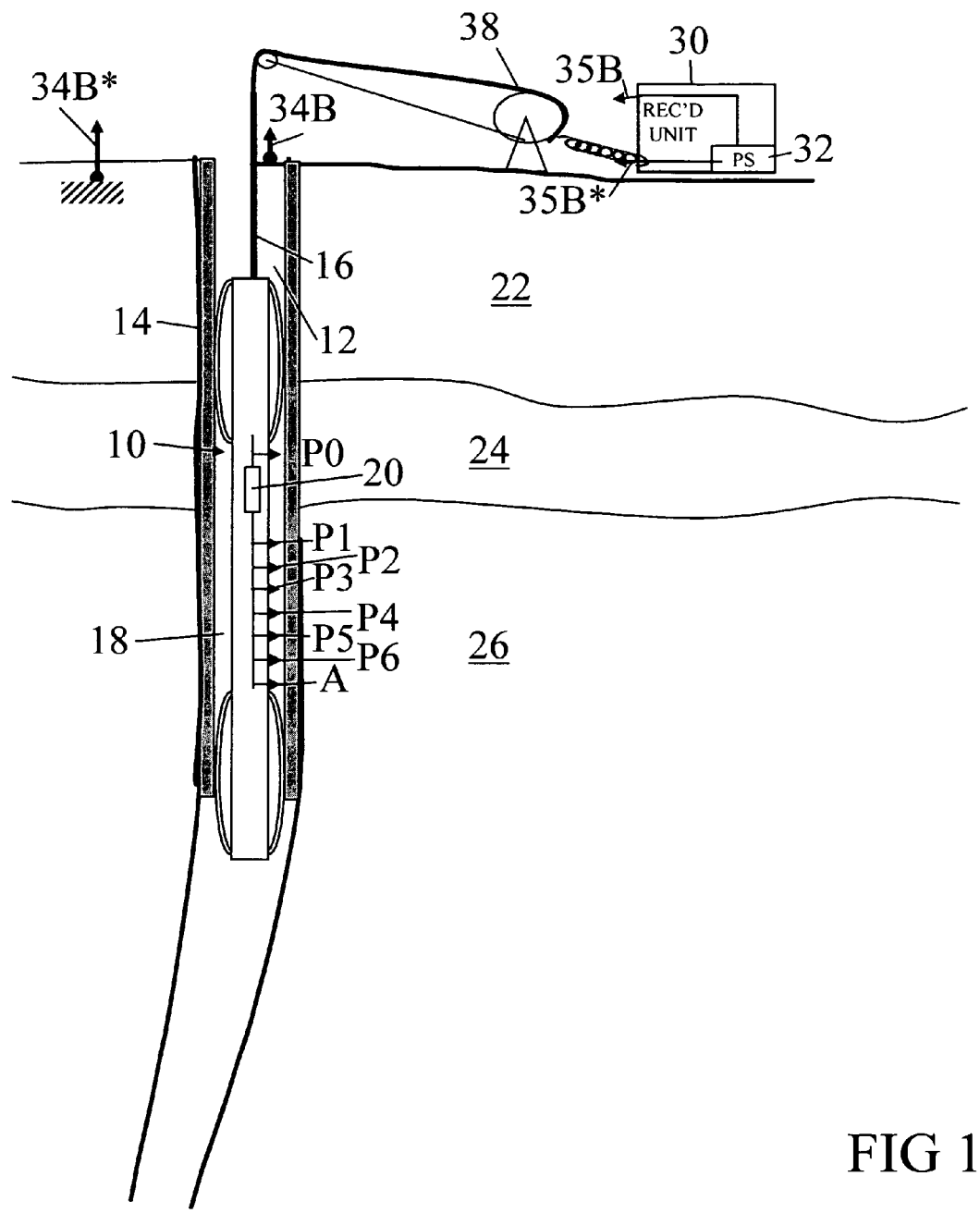
FIG. 1 shows an example resistivity measurement through casing apparatus according to the invention being used in a cased wellbore.

One embodiment of a well logging instrument used to measure resistivity of Earth formations from within a wellbore 14, when the wellbore has a conductive pipe or casing within, is shown schematically in FIG. 1. The instrument 10 may include a sonde or similar mandrel-type housing 18. The housing 18 is preferably made from an electrically non-conductive material, or has such non-conductive material on its exterior surface. The housing 18 is adapted to be inserted into and withdrawn from the wellbore 14, by means of any well logging instrument conveyance known in the art. In the present example, the conveyance can be an armored electrical cable 16, extended and retracted by a winch 38. Other conveyances known in the art may be used, including coiled tubing, drill pipe, production tubing, etc. Accordingly, the conveyance is not a limit to the scope of the invention.

The wellbore 14 is drilled through various Earth formations, shown schematically at 22, 24 and 26. Typically after the wellbore 14 is drilled, a conductive pipe 12 or casing is inserted into the wellbore 14. If the pipe 12 is a casing, then the casing 12 is typically cemented in place within the wellbore 14, although cementing the pipe or casing is not necessary to operation of the instrument 10. While the embodiment shown in FIG. 1 is described in terms of a "casing" being inserted and cemented into a drilled wellbore, it should be understood that other types of electrically conductive pipe, such as drill pipe, coiled tubing, production tubing and the like may also be used with an instrument according to the invention. For example, the pipe 12, rather than being casing, may be drill pipe. It is known in the art that during drilling that the drill pipe may become stuck in the wellbore 14. In such event, the instrument 10 can be lowered into the stuck drill pipe on an armored electrical cable 16 to make formation resistivity measurements as will be further explained.

The armored electrical cable 16 includes one or more insulated electrical conductors (not shown separately), and is arranged to conduct electrical power to the instrument 10 disposed in the wellbore 14. Electrical power can be conducted from, and signals from the instrument 10 can be transmitted to, a recording unit 30 disposed at the Earth's surface using the electrical conductors in the cable 16. The recording unit 30 may also be used to record and/or interpret the signals communicated thereto from the instrument 10 in the wellbore 14. The recording unit 30 may include an electrical power supply 32 used to make measurements for determining resistivity of the various Earth formations 22, 24, 26. In the present description, any electrical power supply used to enable making the measurements corresponding to formation resistivity will be referred to as a "measuring current source." The power supply 32 may also be used merely to provide electrical power to various measurement and control circuits, shown generally at 20 in FIG. 1, in the instrument 10. The functions provided by the various circuits in the instrument 10 will be further explained below with reference to FIG. 2.

Still referring to FIG. 1, a measuring current return electrode 34B* is provided at the Earth's surface at a selected distance from the wellbore 14. The measuring current return electrode 34B* is typically inserted into formations proximate the Earth's surface so as to provide an electrically conductive path to the Earth formations 22, 24, 26 penetrated by the wellbore 14. The measuring current return electrode 34B* provides, in particular, a current path through the Earth formations 22, 24 26 for electrical measuring current to flow from a source electrode A on the instrument 10. The current return electrode 34B* may be connected, as shown in FIG. 1, either to circuits 35B* in the recording unit 30, or alternatively may be connected to one of the electrical conductors (not shown separately) in the cable 16. A casing current return electrode 34B, shown connected to the top of the pipe or casing 12, provides a return path for electrical measuring current caused to flow from the current source electrode A on the instrument 10, to the top of the casing 12. The casing current return electrode 34B may be coupled to circuits 35B in the recording unit 30, or may be coupled to one of the conductors (not shown) in the cable 12 for return to the circuits 20 in the instrument 10.

The instrument 10 includes a plurality of electrodes, shown at A, and P0 through P6 disposed on the sonde mandrel 18 at axially spaced apart locations. The electrodes A, P0-P6 are electrically isolated from each other by the non-conductive material disposed on the exterior of, or forming, the sonde mandrel 18. Each of the electrodes A, P0-P6 is mechanically and electrically adapted to make good electrical contact with the casing 12. Various types of casing-contact electrodes are known in the art and include brushes, hydraulically actuated "spikes", spiked wheels and similar devices. The electrodes A, P0-P6 are each coupled to a selected portion of the electronic circuits 20 in the instrument 10.

During operation of the instrument 10 when conveyed by armored cable, the cable 16 is extended by the winch 38 so that the instrument 10 is positioned at a selected depth in the wellbore 14. Electrical power is passed through the casing 12 and through the Earth formations 22, 24, 26 by selective connection between the source electrode A at one end of the current path, and either the casing return 34B or formation return 34B*, respectively, at the other end of the current path. Measurements are made of the voltage extant between a reference potential electrode, shown as electrode P0 in FIG. 1, and one or more potential measurement electrodes, P1-P6 in FIG. 1. Depending on the type of electrodes used, for example, brushes or spiked contact wheels, it may be possible, in some embodiments, for the instrument 10 to be moved slowly along the wellbore 14 as the measurements are being made. Other types of electrode, such as hydraulically actuated spikes, may require that the instrument 10 remain essentially stationary during any one measurement sequence. As the voltage measurements are made, whether the instrument 10 is stationary or moving, the instrument 10 is gradually withdrawn from the wellbore 14, until a selected portion of the wellbore 14, including formations of interest, 22, 24, 26, have voltage measurements made corresponding to them, both using the casing current return 34B and the formation current return 34B*.

Figure 2:
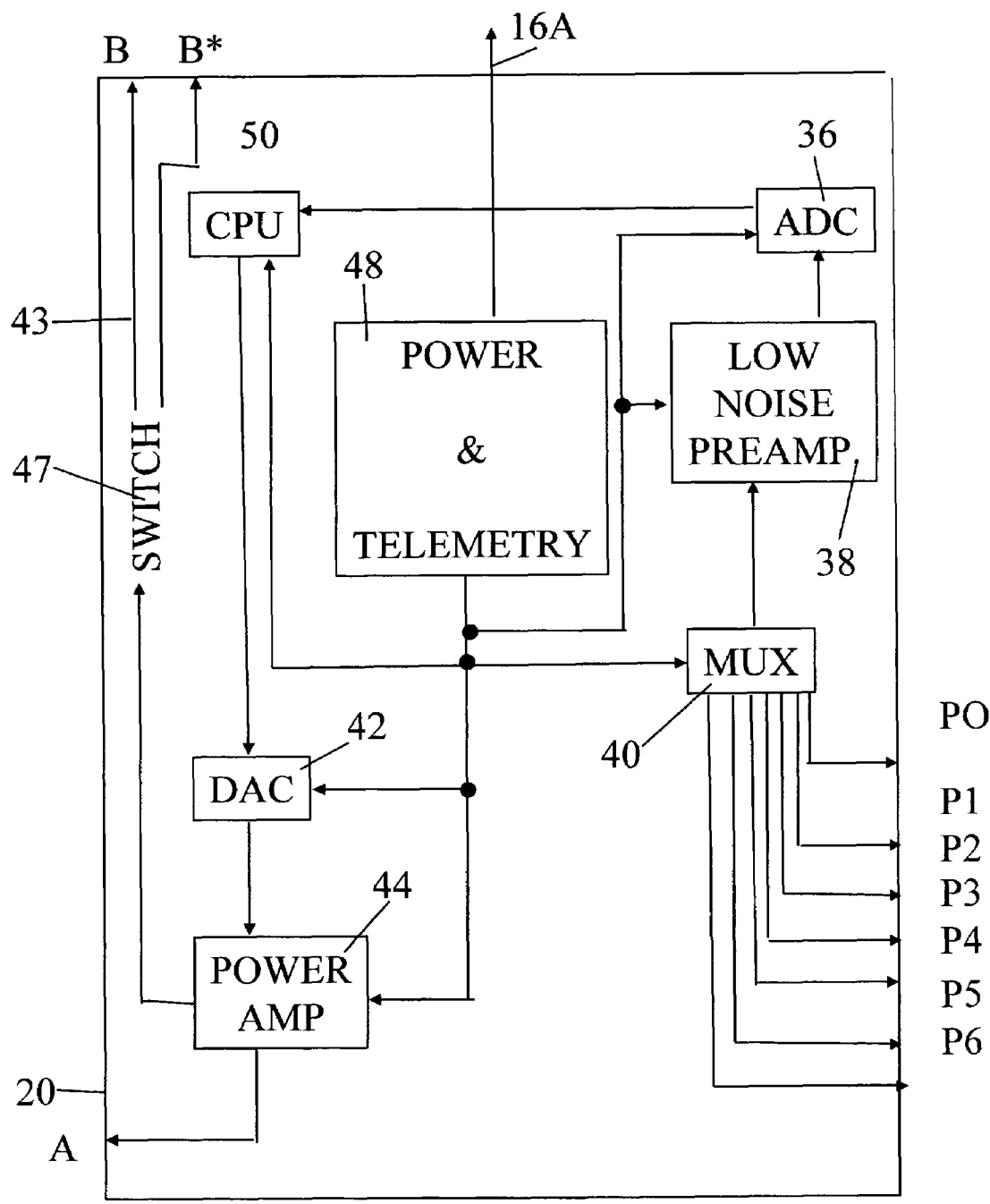
FIG. 2 shows a circuit systems of the example apparatus of FIG. 1 in more detail.

One embodiment of the electronic circuits 20 is shown in greater detail in FIG. 2. The present embodiment of the circuits 20 may include a central processing unit (CPU) 50, which may be a preprogrammed microcomputer, or a programmable microcomputer. In the present embodiment, the CPU 50 is adapted to detect control commands from within a formatted telemetry signal sent by the recording unit (30 in FIG. 1) to a telemetry transceiver and power supply unit 48. The telemetry transceiver 48 also performs both formatting of data signals communicated by the CPU 50 for transmission along a cable conductor 16A to the recording unit (30 in FIG. 1) and reception and conditioning of electrical power sent along the conductor 16A for use by the various components of the circuits 20. The CPU 50 may also be reprogrammed by the command signals when such are detected by the telemetry transceiver 48 and conducted to the CPU 50. Reprogramming may include, for example, changing the waveform of the measure current used to make the previously explained voltage drop measurements. Reprogramming may also include changing the magnitude of the measure current, and may include changing a sample rate of voltage drop measurements, among other examples. Still other forms of reprogramming will be explained with reference to FIGS. 4 through 6.

While the embodiment shown in FIG. 2 includes an electrical telemetry transceiver 48, it should be clearly understood that optical telemetry may be used in some embodiments, and in such embodiments the telemetry transceiver 48 would include suitable photoelectric sensors and/or transmitting devices known in the art. In such embodiments, the cable 16 should include at least one optical fiber for conducting such telemetry signals. One embodiment of an armored electrical cable including optical fibers therein for signal telemetry is disclosed in U.S. Pat. No. 5,495,547 issued to Rafie et al. Other embodiments may use optical fibers to transmit electrical operating power to the instrument 10 from the recording unit 30. The cable disclosed in the Rafie et al. '547 patent or a similar fiber optic cable may be used in such other embodiments to transmit power to the instrument over optical fibers.

The CPU 50 may include in its initial programming (or may be so programmed by reprogramming telemetry signals) a digital representation of various current waveforms used to energize the Earth formations (22, 24 26 in FIG. 1) and the casing (12 in FIG. 1) for determining the resistivity of the Earth formations (22, 24, 26 in FIG. 1). The digital representation includes information about the frequency content, the shape of the waveform and the amplitude of the current to be conducted through the formations and casing. The digital representation can be conducted to a digital to analog converter (DAC) 42, which generates an analog signal from the digital representation. The analog signal output of the DAC 42 is then conducted to the input of a power amplifier 44. The power amplifier 44 output is connected between the current source electrode A and a switch 47. The switch 47 is under control of the CPU 50. The switch 47 alternates connection of the other output terminal of the power amplifier 44 between the casing return electrode B and the formation return electrode B*, or other current electrodes in other electrode arrangements. Alternatively, the other output terminal of the power amplifier 44 may be connected to one of more cable conductors (either 16A or other electrical conductor), and the switching between casing return and formation return may be performed within the recording unit (30 in FIG. 1). Yet another alternative omits the DAC 42 and the power amplifier 44 from the circuits 20, and provides measuring current and switching features using the power supply (32 in FIG. 1) in the recording unit (30 in FIG. 1) and appropriate conductors (not shown) in the cable (16 in FIG. 1). In the latter example embodiment, measuring current may be conducted to the source electrode A using one or more cable conductors, such as 16A in FIG. 2.

In the present embodiment, voltage measurements can be made between the potential reference electrode P0 and a selected one of the potential measuring electrodes P1-P6. The one of the voltage measuring electrodes from which measurements are made at any moment in time can be controlled by a multiplexer (MUX) 40, which itself may be controlled by the CPU 50. The output of the MUX 40 is connected to the input of a low noise preamplifier or amplifier 38. The output of the preamplifier 38 is coupled to an analog to digital converter (ADC) 36. The ADC 36 may be a sigma delta converter, successive approximation register, or any other analog to digital conversion device known in the art, that preferably can provide at least 24 bit resolution of the input signal. Digital signals output from the ADC 36 represent the measured potential between the reference electrode P0 and the MUX-selected one of the voltage measuring electrodes P1-P6. One possible advantage of using the MUX 40 and single preamplifier 38 as shown in FIG. 2 is that the analog portion of the voltage measuring circuitry will be substantially the same irrespective of which voltage measuring electrode P1-P6 is being interrogated to determine potential drop with respect to electrode P0. As a result, measurement error caused by differences in preamplifier 38 response may be reduced or eliminated. Preferably, the ADC 36 is a twenty-four bit device capable of accurately resolving measurements representing voltage differences as small as one nanovolt ($1 \times 10^{-9}$ volts). Alternatively, each measurement electrode P1-P6 could be coupled to one input terminal of a separate preamplifier (not shown in the Figures) for each electrode P1-P6, thus eliminating the MUX 40 from the analog input circuitry.

Digital words representing the voltage measurements can be conducted from the ADC 36 to the CPU 50 for inclusion in the telemetry to the recording unit (30 in FIG. 1). Alternatively, the CPU 50 may include its own memory or other storage device (not shown separately) for storing the digital words until the instrument (10 in FIG. 1) is removed from the wellbore (14 in FIG. 1). In some embodiments, a sample rate of the ADC 36 is in the range of several kilohertz (kHz) both to provide both a very large number of voltage signal samples, preferably at least one thousand, per cycle of current waveform, and to be able to sample transient effects when switched DC is used as a current source to make resistivity measurements. In such embodiments, a switching frequency of the switched DC can be in a range of about 0.01 to 20 Hz, thus enabling the ADC 36 to make preferably at least one thousand, and as many as several thousand, voltage measurement samples within each cycle of the switched DC.

In the present embodiment, the ADC 36 operates substantially continuously, to provide a relatively large number of digital signal samples for each cycle of the current source waveform. In the present embodiment, such substantially continuous operation of the ADC 36 may provide the advantage of precise, prompt determination of any DC bias in the voltage measurements. Such DC bias must be accounted for in order to precisely determine formation resistivity from the voltage measurements. In systems known in the art which do not operate voltage measuring devices substantially continuously, it is necessary to determine DC bias by other means. See, for example, U.S. Pat. No. 5,467,018 issued to Rueter et al.

Figure 3A:
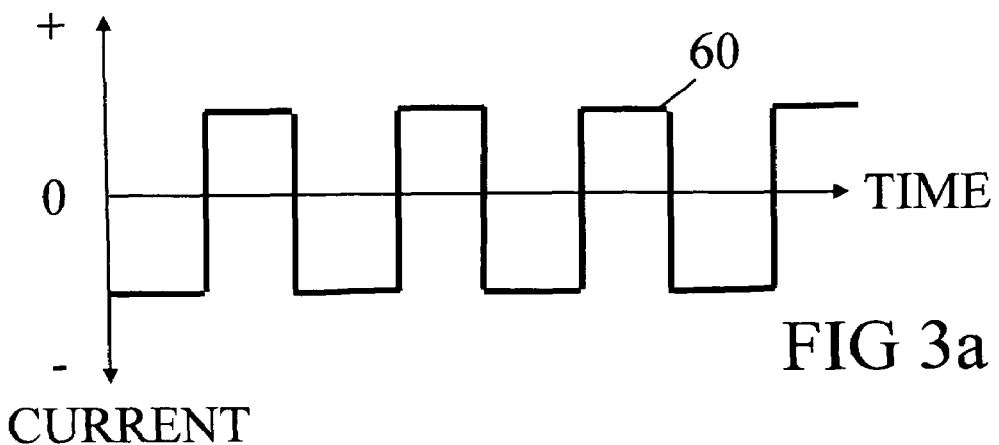
FIGS. 3A through 3C show different examples of current waveform for making through casing resistivity measurements according to the invention.
Figure 3B:
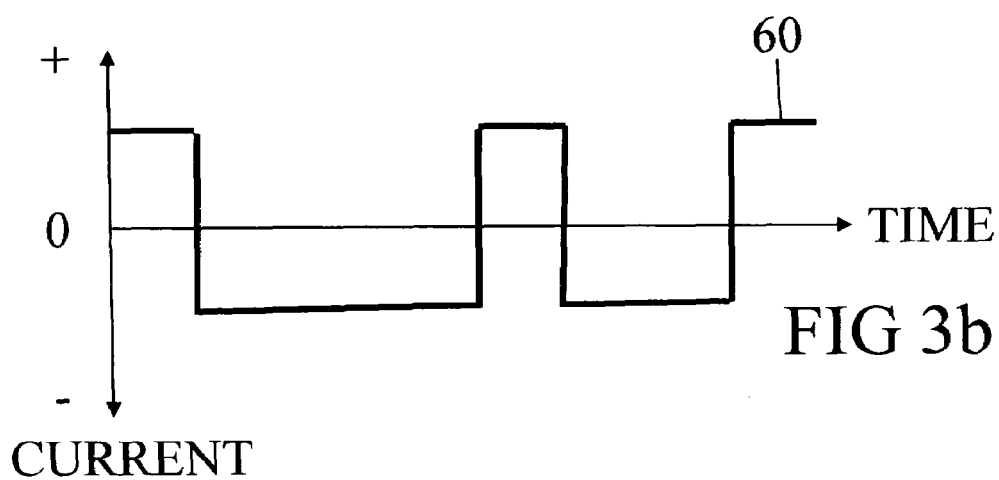
Figure 3C:
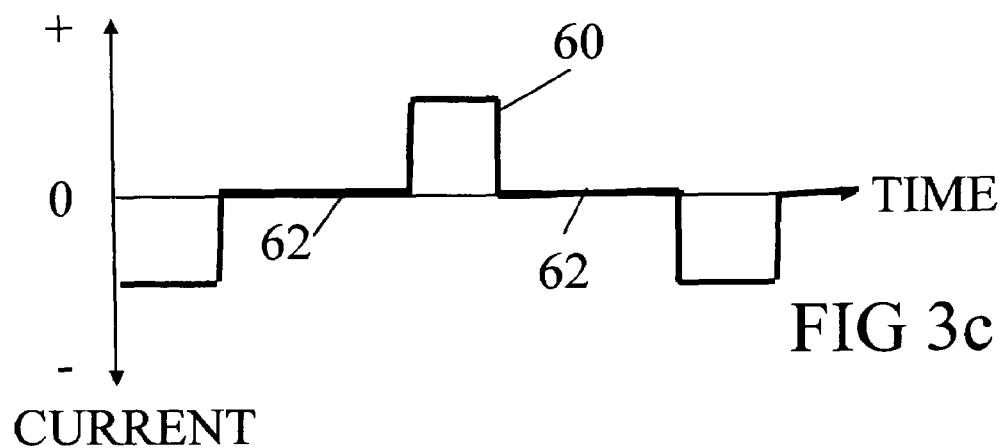

The measuring current waveform, as previously explained, may be generated by conducting waveform numerical values from the CPU 50, or other storage device (not shown) to the DAC 42. Referring now to FIGS. 3A through 3C, several types of current waveforms particularly suited to making through-casing (or through electrically conductive pipe) resistivity measurements will be explained. FIG. 3A is a graph of current output of the power amplifier (44 in FIG. 2) with respect to time. The current waveform 60 in FIG. 3A is a low frequency (0.01 to 20 Hz) square wave, which may be generated using switched DC, or by conducting appropriate numbers representing such a waveform to the DAC (42 in FIG. 2). The waveform 60 in FIG. 3A is periodic, meaning that the waveform is substantially constant frequency within a selected time range, and has 100 percent "duty cycle", meaning that current is flowing substantially at all times.

Another possible current waveform is shown at 60 in FIG. 3B. The current waveform in FIG. 3B is a random or pseudo random frequency square wave, also having 100 percent duty cycle. As with the previous embodiment (FIG. 3A), the embodiment of current waveform shown in FIG. 3B may be generated by conducting appropriate digital words from the CPU (50 in FIG. 2) to the DAC (42 in FIG. 2). Random switching will be advantageous to avoid aliasing or other adverse effects related to periodic data sampling.

Another possible waveform is shown at 60 in FIG. 3C. The current waveform 60 in FIG. 3C is a periodic square wave having less than 100 percent duty cycle. Less than 100 percent duty cycle can be inferred from time intervals, shown at 62, in which no current is flowing. As with the previous embodiment (FIG. 3A), the embodiment of current waveform shown in FIG. 3C may be generated by conducting appropriate digital words from the CPU (50 in FIG. 2) to the DAC (42 in FIG. 2). Using less than 100 percent duty cycle may be advantageous to save electrical power where measured voltage drops are sufficiently large to make possible a reduction in the number of voltage samples measured. Using less than 100 percent duty cycle may also enable determination of some transient effects, by measuring voltage drops across the various electrodes (P0 *b* between P1-P6 in FIG. 1) during a short time interval after the current is switched off. Such induced potential (IP) effects may be related to fluid composition within the pore spaces of the Earth formations (22, 24, 26 in FIG. 1). Using less than 100 percent duty cycle may also enable better determination of any DC bias, by using the times with no current flow 62 as measurement references.

The foregoing examples shown in FIGS. 3A, 3B and 3C are not the only current waveforms that may be generated using the CPU/DAC combination shown in FIG. 2. As will be readily appreciated by those skilled in the art, substantially any frequency and waveform type may be generated, including for example sinusoidal waveforms, by conducting appropriate digital words to the DAC (42 in FIG. 2). In some embodiments, the digital words may be stored in the CPU (50 in FIG. 2). In other embodiments, the digital words themselves, or a command which activates selected waveform digital words, may be transmitted from the recording unit (30 in FIG. 1) to the instrument (10 in FIG. 1) over the cable (16 in FIG. 1). In other embodiments, the waveform may be a pseudo random binary sequence (PRBS).

Referring once again to FIG. 2, some embodiments may include one or more of the following features, either programmed into the CPU 50, or programmed into a surface computer in the recording unit (30 in FIG. 1). Some embodiments may include automatic editing of voltage measurements made across the one or more electrode pairs, P0 between any one of P1-P6. For example, if a particular digital voltage sample represents a number outside of a selected range, the sample may be discarded, and an interpolated value may be written to storage in the CPU 50, or transmitted to the recording unit (30 in FIG. 1) for the outlying sample value. Alternatively, if voltage measurements do not increase monotonically as the spacing between P0 and the various measurement electrodes P1-P6 is increased, the anomalous voltage samples may be discarded; interpolated or otherwise not written directly to storage. Other embodiments may include stacking of voltage measurement words corresponding to the same electrode pair (P0 between any of P1-P6) at substantially the same depth in the wellbore to improve the signal to noise ratio of the measurements significantly.

Referring once again to FIG. 1, still other embodiments may include permanent installation of an array of electrodes, such as shown in FIG. 1 at A and P0 through P6 inside the casing 16. A cable or similar device may be used to make electrical connection to the Earth's surface from inside the wellbore 14 at a selected depth proximate a petroleum bearing reservoir, for example, formation 24 in FIG. 1. Measurements may be made at selected times during the life of the wellbore 14 to determine movement of a water contact (not shown in FIG. 1) with respect to time. In such permanent emplacements of electrodes A, P0-P6, the circuits 20 may be disposed at the Earth's surface, or may themselves be disposed in the wellbore 14, just as for the cable conveyed instrument described earlier herein.

Operating the instrument may be performed in a number of different ways, of which several will be explained herein. In a regular measurement mode, the instrument 10 may be moved to a selected depth in the wellbore 14 at which measurements are to be made. First, the circuits 20 are operated, either by internal programming of the CPU (50 in FIG. 2) or by command transmitted from the recording unit (30 in FIG. 1) first to enable measuring voltage drop caused by current flow entirely along the casing 12. To make casing voltage drop measurements, the power amplifier (44 in FIG. 2) is connected between the current source electrode A on the instrument 10 and casing current return electrode 34B coupled to the top of the casing (12 in FIG. 1) at the Earth's surface. Voltage measurements between P0 and any one or more of P1 through P6 are then made. The output of the power amplifier (44 in FIG. 2) is then switched to return the measuring current at measuring current return electrode 34B* at the Earth's surface. Another set of voltage measurements between P0 and the same ones of P1 through P6 are made. The instrument 10 may then be moved a selected axial distance along the wellbore 14, and the measuring process can be repeated. Values of voltage difference made between P0 and any one or more of P1 through P6 can be converted mathematically into a second derivative, with respect to depth in the wellbore 14, of the measured voltage drop. The values of such second derivative are related to the depth-based current leakage into the Earth formations 22, 24, 26, and are thus related to the electrical conductivity of each of the formations 22, 24, 26. Advantageously, an instrument configured substantially as shown in FIGS. 1 and 2 does not require measurement of voltage drop across cascaded differential amplifiers (all of which would be analog) to determine the second derivative of voltage drop with respect to depth.

Figure 4:
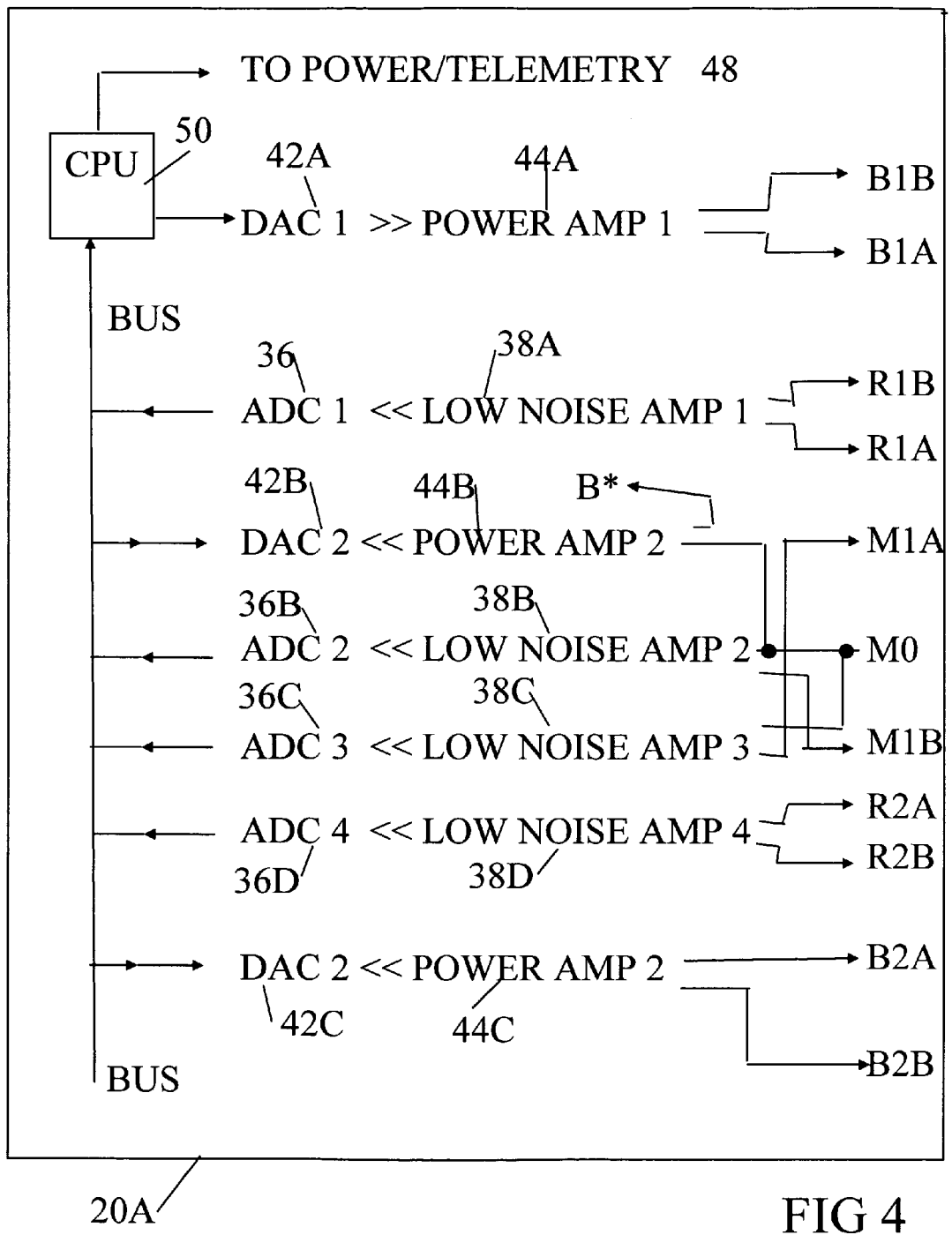
FIG. 4 shows an example instrument for measuring resistivity through a conductive pipe which includes current focusing systems.

Performance of an instrument according to the invention may be improved by providing focusing current systems to axially constrain the flow of measuring current through the various Earth formations. An example instrument which includes focusing current systems is shown schematically in FIG. 4. The principle of measurement of the example instrument shown in FIG. 4 is described in U.S. Pat. No. 2,729,784 issued to Fearon, incorporated herein by reference. The instrument in FIG. 4 includes an array of electrodes disposed at selected locations along the instrument mandrel or housing (18 in FIG. 1). The electrodes may be similar in mechanical and electrical configuration to the electrodes described above with reference to FIG. 1. The electrodes are adapted to make electrical contact with the pipe or casing (12 in FIG. 1) in the wellbore (14 in FIG. 1).

The electrodes in the embodiment of FIG. 4 include two pairs of focusing current electrodes, shown at B1A, B1B and B2A, B2B, approximately equally spaced on either axial side of a central measuring current source electrode M0. Reference potential measuring electrodes R1A, R1B and R2A, R2B are disposed, respectively, between each focusing current electrode pair B1A, B1B; B2A, B2B, and the measuring current source electrode M0. Each focusing current electrode pair B1A, B1B and B2A, B2B is connected across the output of a corresponding focusing current power amplifier 44A, 44C, respectively. In the present embodiment, the focusing current is generated by driving each power amplifier 44A, 44C using the output of a corresponding DAC 42A, 42C. Each DAC 42A, 42C can be connected to a bus or other similar data connection to the CPU 50. As in the embodiment explained above with reference to FIG. 2, the embodiment shown in FIG. 4 may include digital words stored or interpreted by the CPU 50 which represent the focusing current waveform to be generated by each power amplifier 44A, 44C and conducted to the casing (12 in FIG. 1). Aspects of the waveform which may be controlled include amplitude, phase, frequency and duty cycle, among other aspects.

Each pair of reference potential measuring electrodes R1A, R1B and R2A, R2B is coupled across the input terminals of a respective low noise preamplifier 38A, 38D, or low noise amplifier, similar to the preamplifier described with reference to FIG. 2. Each low noise preamplifier 38A, 38D has its output coupled to an ADC 36, 36B. The ADC 36, 36B outputs are coupled to the bus or otherwise to the CPU 50. In the present embodiments, the ADCs 36, 36B are preferably 24 bit resolution devices, similar to the ADC described with reference to FIG. 2. In the present embodiment, potential difference measurements are made across each pair of reference potential electrodes R1A, R1B and R2A, R2B, respectively. The CPU 50 receives digital words representing the measured potential across each reference electrode pair R1A, R1B and R2A, R2B, respectively. The magnitude of the focusing current output by each power amplifier 44A, 44C can be controlled by the CPU 50 such that the measured potential across each pair of reference potential electrodes R1A, R1B and R2A, R2B, respectively, is substantially equal to zero. The CPU 50 may cause such adjustments to be made by, for example, changing the amplitude or changing the duty cycle of the power amplifier 44A, 44B outputs, or both. Changes to amplitude and/or duty cycle may be made to either or both power amplifier 44A, 44B. Other methods for changing or adjusting the power output of each focusing current power amplifier 44A, 44C will occur to those skilled in the art. The purpose of making such focusing current magnitude adjustments so as to maintain substantially zero potential across the reference electrodes R1A, R1B and R2A, R2B, respectively, is to assure that there is a region within the casing (12 in FIG. 1) where substantially no net current flows along the casing in either an upward or downward direction.

The embodiment of FIG. 4 can include a digitally controlled measuring current source. The source consists of, in the present embodiment, a measuring current DAC 42B coupled to the bus or otherwise to the CPU 50. Measuring current is generated by conducting waveform words to the DAC 42B, which converts the words into a driver signal for a measuring current power amplifier 44B coupled at its input to the DAC 42B output. Measuring current output from the measuring current power amplifier 44B is coupled to the measuring current source electrode M0, and maybe returned at the Earth's surface, at return electrode 34B*, or alternatively at casing current return 34B. Measuring potential electrodes M1A, M1B are disposed on either side of the measuring current source electrode M0. Each measuring potential electrode M1A, M1B, and the source electrode M0 is coupled across the input of a respective measuring potential low noise amplifier 38B, 38C. The output of each measuring potential low noise amplifier 38B, 38C is coupled to a respective ADC 36B, 36C, wherein digital words representing the value of measured potential across each respective pair of measure potential electrodes M1A, M0 and M1B, M0 are conducted to the CPU 50 for processing. The measuring potential ADC 36B, 36C is also preferably a 24 bit resolution device. Resistivity of the Earth formations outside the casing is related to the potential across the measuring potential electrodes and the magnitude of the measuring current. Waveform, frequency and duty cycle of the measuring current may be controlled in a substantially similar manner as explained with reference to the embodiment of FIG. 2.

Possible advantages of a system as shown in FIG. 4 include more accurate control over focusing current properties than was previously possible, making measurements of potential across the measuring electrodes M1A, M1B more accurate.

Figure 5:
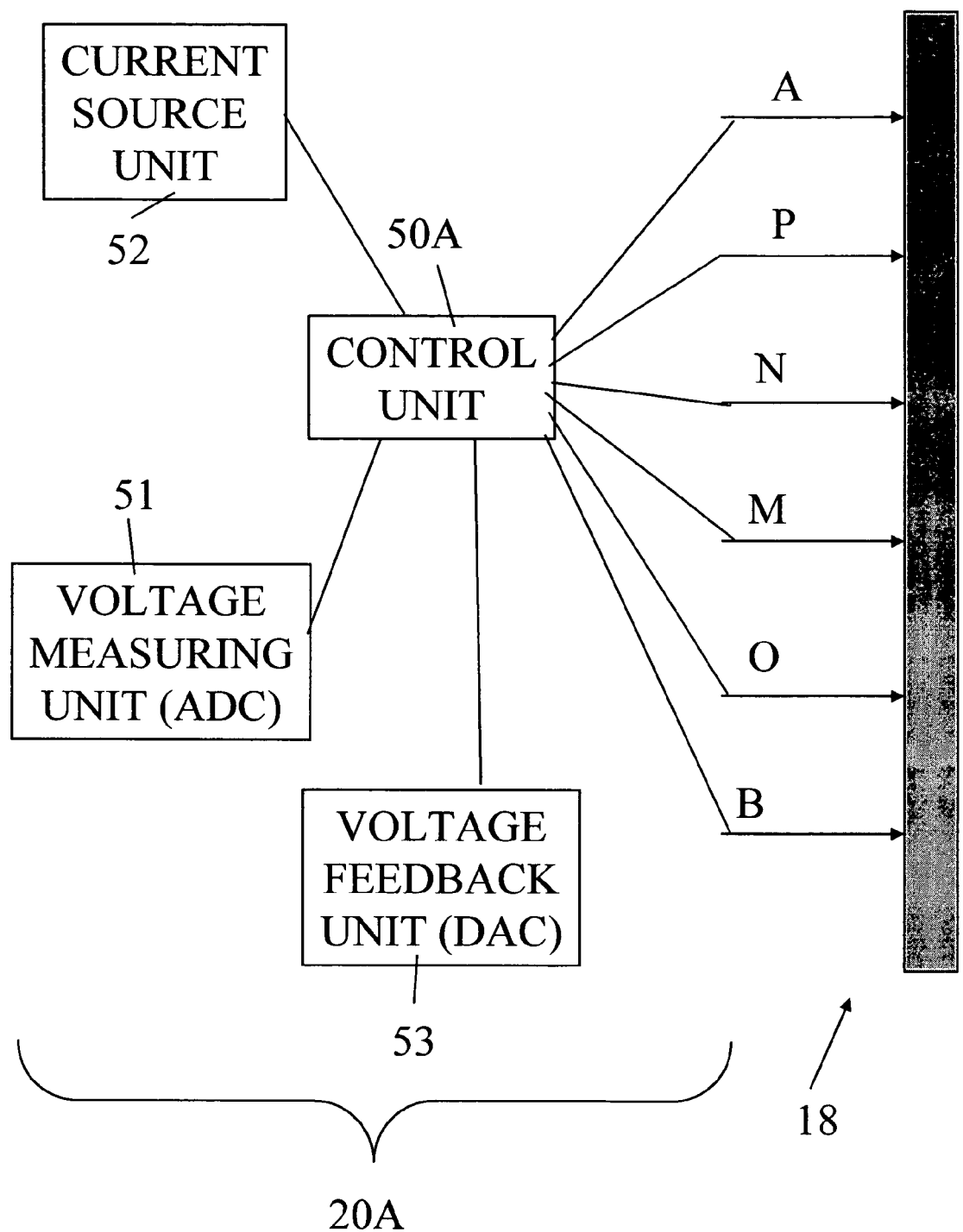
FIG. 5 shows an alternative embodiment of an apparatus including a selectable array of electrodes on a sonde mandrel.

Another embodiment of an instrument according to the invention is shown schematically in FIG. 5. The instrument includes an array of electrodes disposed on the instrument housing 18 at axially spaced apart locations. The electrodes are designated A, B, P, O, N and M. The electrodes are coupled through a switching system, designated "control unit" 50A (which may be associated with for form part of a controller similar in design to CPU 50 from FIG. 2). The control unit 50A selects which electrodes are coupled to which one or selected circuits. The circuits include a current source 52. The current source 52 may be a digital synthesizer, and may include a DAC and power amplifier (not shown separately). The circuits may include a voltage (or potential) measuring circuit 51, which may include a low noise preamplifier and ADC (not shown separately) as explained with reference to FIG. 2. The circuits may also include a voltage feedback unit 53, which may be similar in configuration to the focusing current source explained with reference to FIG. 4.

To perform various types of measurements, the instrument shown in FIG. 5 can select the measuring and focusing current sources to be applied to, and voltage measurements to be made across, selected ones of the electrodes and selected electrode pairs. Examples of various modes of measurement, and the electrodes used to make measurements in each of the modes, are explained in the following table:

| Measurement Mode | Current source and return electrodes | Potential measured across electrodes |
|---|---|---|
| Downhole, completely contained | A, B | M and N; O and P |
| Deep penetrating resistivity | B, current return is at Earth's surface away from top of casing (return 34B*) | M and N; O and P |
| Fast measurement | M and N | A and B; O and P |
| Mixed | Mix sources | Mix pairs |

In the above table, the "Current source and return electrodes" column represents the electrodes coupled to the measuring current source 52. Potential measurement is made across electrode pairs as indicated in the "Potential measured across electrodes" column.

Figure 6:
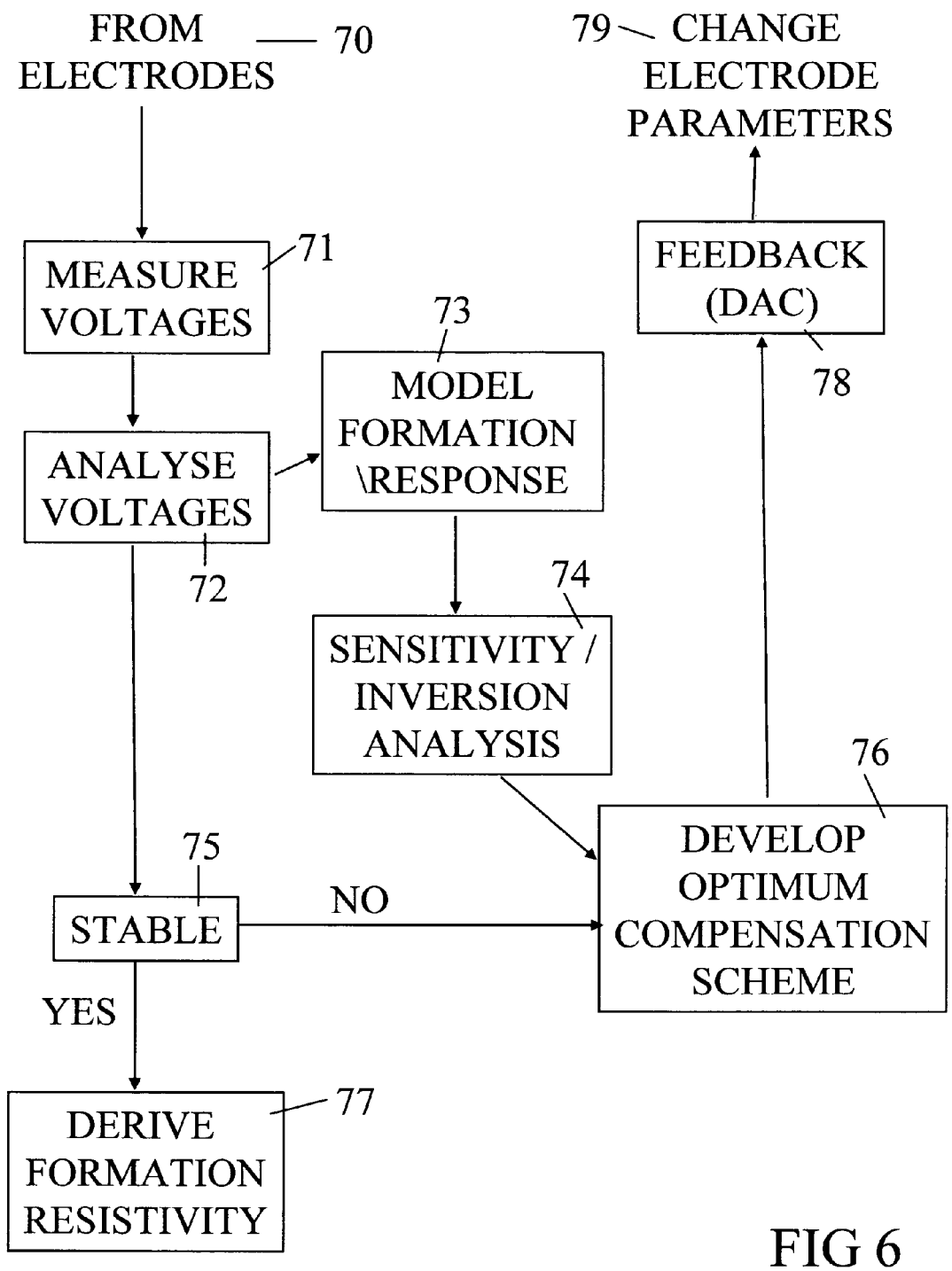
FIG. 6 shows a flow chart of operation of an instrument such as shown in FIG. 4 adapted to automatically optimize control of electrode usage according to a model based instrument response.

Various configurations of an instrument according to the invention which include a suitably programmed CPU (50 in FIG. 2) may provide substantially real-time automatic control of selection of the various electrodes for the purposes as explained above with reference to FIG. 4, namely axial spacings of the voltage measuring electrodes, and the spacing of and amount of focusing current supplied to various focusing electrodes. A generalized flow chart showing one embodiment of a system programmed to perform the foregoing functions is shown in FIG. 6. At 70, initially configured electrodes, current sources and voltage measuring circuits emit measuring current, focusing current and make voltage measurements, respectively. Initial configuration may be set by the system operator, or may be preprogrammed. Preprogrammed or operator-selected initial configuration may be based on parameters such as expected thickness of the various Earth formations and expected resistivities of the various Earth formations, among other parameters. At 71, voltages are measured, at least for one pair of voltage measuring electrodes. In configurations which include reference potential electrodes, for example as explained with reference to FIG. 4, such reference potentials may also be measured. At 72 the measured voltages are analyzed. Analysis may include determining a magnitude of voltage drop along the casing to determine casing resistance, and may include determining voltage drop of leakage current into the formations. Analysis may include determination of polarization direction for reference potential measurements which are not substantially equal to zero. At 75, the analysis is used to determine if the response obtained represents a stable set of formation resistivity calculations. If the response is stable, at 77, the voltage measurements are used to determine formation resistivity, typically, as previously explained, by determining a second derivative, with respect to depth, of the magnitude of leakage current corrected for casing resistance variation in the vicinity of where the measurements are made.

At 73, the voltage measurements may be used to develop a model of the resistivity distribution around the outside of the wellbore (14 in FIG. 1) proximate the instrument (10 in FIG. 1). Methods for determining a model of the Earth formations are disclosed, for example, in U.S. Pat. No. 5,809,458 issued to Tamarchenko (1998), entitled, *Method of simulating the response of a through-casing resistivity* well logging instrument and its application to determining resistivity of earth formations. At 74, the model is subjected to a sensitivity analysis. The model, using appropriate sensitivity analysis, may be used, at 76, to determine an optimum arrangement of focusing current electrodes. If the determined optimum focusing current electrode arrangement is different from the initial or current configuration, the configuration is changed, at 79, and focusing current parameters are changed at 78 to provide the model with the optimum sensitivity response.

Figure 7:
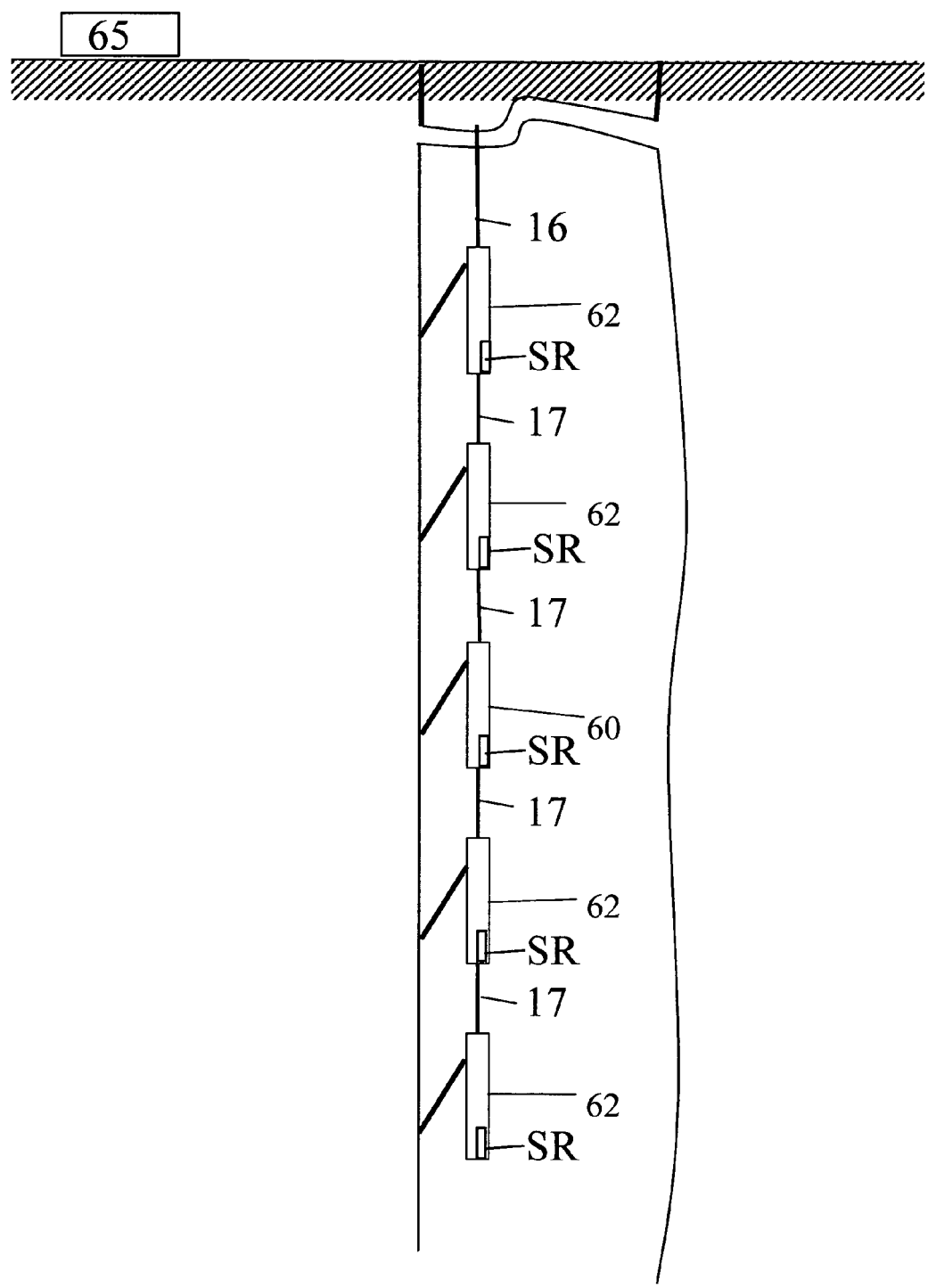
FIG. 7 shows a system for measuring resistivity through conductive pipe including a central control unit and a plurality of "satellite" units.

A different embodiment which may be used to investigate relatively long axial spans between electrodes, as well as shorter axial spans, is shown schematically in FIG. 7. The embodiment in FIG. 7 includes a plurality of "satellite" or auxiliary instrument units, shown generally at 62, coupled to each other axially by cable segments 17. Any number of auxiliary units 62 may be used in a particular implementation. Each auxiliary unit 62 may include one or more electrodes made as previously explained and adapted to make electrical contact with the casing (12 in FIG. 1). Each auxiliary unit 62 may include one or more current sources, configured as explained with reference to FIG. 2, and one or more voltage measuring circuits, also configured as explained with reference to FIG. 2. The length of the cable segments 17 is not a limitation on the scope of the invention, however, it is contemplated that the length of the cable segments is typically about 1 to 1.5 meters.

The auxiliary units 62 may be disposed axially on either side of, and electrically connected to, a central control unit 60. The central control unit 60 may include a central processor, similar in configuration to the CPU explained with reference to FIG. 2. The control unit 60 may operate the various auxiliary units 62 to perform as current source electrodes and/or current return electrodes for either or both measuring current or focusing current, these currents as explained with reference to FIG. 4. The various electrodes on the auxiliary units 62 may also be configured to make voltage measurements of either or both measuring current and focusing current, also as explained with reference to FIG. 4. In some embodiments, the central control unit 60 may itself include one or more current sources (not shown separately) and one or more voltage measuring circuits (not shown separately). The central control unit 60 may also include a telemetry transceiver, similar in configuration to the transceiver explained with reference to FIG. 2, and adapted to communicate measurement signals to the Earth's surface in a selected telemetry format, and to receive command signals from the Earth's surface, along the cable 16. Alternatively, the control unit 60 may include recording devices, as explained with reference to FIG. 2, to store measurements until the instrument is withdrawn from the wellbore (14 in FIG. 1).

The embodiment shown in FIG. 7 may be electronically configured, in some instances, to provide focusing currents across a very long axial span, for example, by selecting innermost auxiliary units (those axially closest to the control unit 60) to provide a focusing current source electrode, and outermost auxiliary units 62 (those axially most distant from the central unit 60) to provide a focusing current return electrode. As will be readily appreciated by those skilled in the art, such a long axial span for focusing current may provide a relatively large radial (lateral) "depth of investigation" of the measuring current, because such measuring current is constrained to flow laterally a larger distance than when the focusing current traverses a smaller axial span.

A possible advantage of the control unit 60/auxiliary unit 62 arrangement shown in FIG. 7 is that the various electrodes may be selectively configured and reconfigured electronically, by the central control unit 60, to make a wide range of different radial depth and axial resolution measurements of Earth formation resistivity outside of a conductive pipe. More specifically, the electrical connections between the one or more electrodes on each of the auxiliary units 62 may be individually addressable by the circuitry in the central control unit 60. While the configuration shown in FIG. 7 could conceivably be adapted to a single, elongated instrument housing, it will be readily appreciated by those skilled in the art that a set of axially shorter units (60, 62) interconnected by flexible cable segments 17 may be more readily inserted into and withdrawn from a wellbore, particularly if the wellbore is not substantially vertical or includes places of relatively high trajectory tortuosity ("dog leg severity").

Any one or more of the auxiliary units 62 may include a seismic receiver SR of any type well known in the art for use within a wellbore. Each such seismic receiver SR may include one or more geophones, hydrophones, accelerometers or other device adapted to detect seismic energy arriving in the wellbore from a seismic energy source 65 disposed at the Earth's surface. Images derived from measurements made by the one or more seismic receivers SR may be used to constrain a model of the Earth formations derived from resistivity measurements as will be explained below with reference to FIG. 9.

Figure 8:
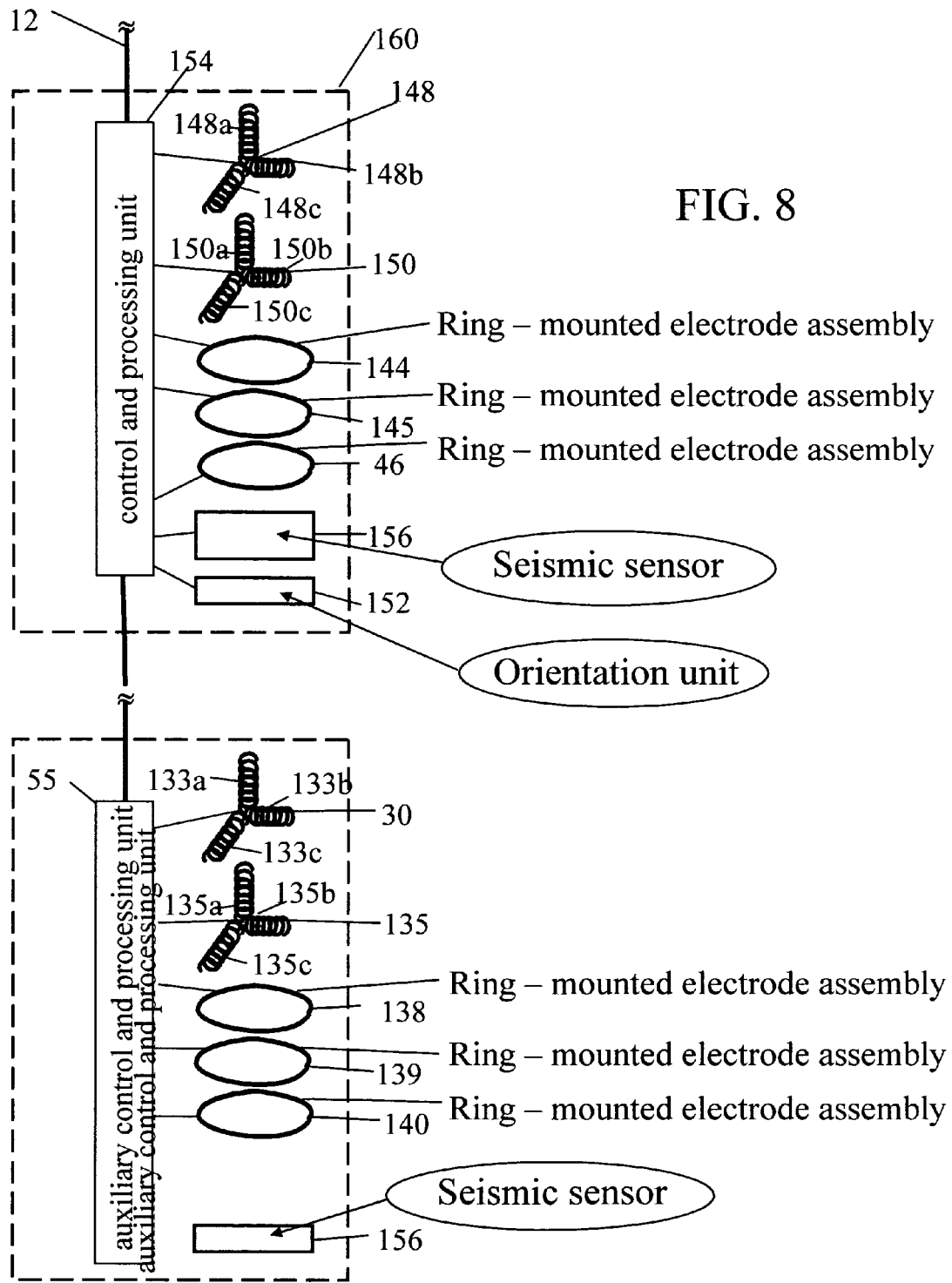
FIG. 8 shows a particular embodiment of satellite unit which includes electromagnetic measurement devices therein.

In another embodiment, the multi-unit (central and auxiliary unit) system such as shown in FIG. 7 may include various forms of electromagnetic measurement devices. Such measurements may be used to complement the measurements made from the previously described embodiments. One embodiment of a system which includes electromagnetic measuring devices is shown in FIG. 8. The electromagnetic measuring devices shown in FIG. 8 are more completely described in U.S. Pat. No. 6,541,975 issued to Strack and incorporated herein by reference. As shown in FIG. 8, the central control unit 60 can include, in addition to the elements described with respect to FIG. 7, one or more 3-component electromagnetic transmitter/receivers, shown as transmitter/receivers 148 and 150 each comprising three coils 148a, 148b and 148c, and 150a, 150b and 150c, respectively, for either transmitting or detecting magnetic fields along three orthogonal orientations. The transmitter/receiver coils may be configured to either transmit or detect a magnetic field. The central control unit 60 will typically include two electromagnetic transmitter/receivers, whereas the auxiliary units 62 will typically include only one electromagnetic transmitter/receiver, because near wellbore measurements will typically be made from the central unit 60. The central unit 60 can also include at least three ring-mounted electrode assemblies 144, 145 and 146. Although these electrode assemblies are shown in FIG. 8 within central unit 60, the ring-mounted electrode assemblies are normally mounted on the exterior surface of the mandrel 149 of the central unit 60.

The central unit 60 will also normally include orientation sensor 152, which may be a standard orientation device known to those of ordinary skill in the art, such as a triaxial magnetometer and/or a gyroscope.

As shown in FIG. 8, each of the auxiliary units 62 will typically include at least one 3-component electromagnetic transmitter/receiver 133 comprising three coils 133a, 133b and 133c for either detecting or transmitting magnetic fields along three orthogonal orientations. The transmitter/receiver coil may be configured to function as either a transmitter or a receiver. If it is desired to transmit and receive a magnetic signal within the same auxiliary unit, a second 3-component electromagnetic transmitter/receiver 135 comprising three coils 135a, 135b and 135c may also be included.

Each of the auxiliary units 62 will also typically also include at least three ring-mounted electrode assemblies, shown as ring-mounted electrode assemblies 138, 139 and 140, in FIG. 8. Each of the auxiliary units 60 will also normally include a seismic sensor 158, which may be a 3-component geophone adapted to sense compressional wave seismic signals in each of three orthogonal directions. In particular embodiments the seismic sensor may be a 4-component sensor in which a pressure sensor, such as a hydrophone, is utilized along with a 3-component geophone. Four component geophones may also be utilized in which the four sensors are at a 54 degree angle from each other, rather than orthogonal as is typical for a 3-component geophone. In particular embodiments, the seismic sensor may be a 5-component sensor in which a pressure sensor is utilized along with a 4-component geophone.

The central unit 60 will typically include a control and processing unit 154. The control and processing unit 154 includes means for function control and for communication, including the transmission of data to the surface, and the electronics to provide buffering of control communications. Control and processing unit 154 also includes means for performing near wellbore definition Those of ordinary skill in the art will appreciate that near wellbore measurements may utilize borehole logging instrument in addition to those comprising the present invention. Near wellbore definition may include but is not limited to definition of tool eccentricity, borehole rugosity, fractures, mud invasion, fracture dip and azimuthal and other parameters related to borehole conditions, environmental corrections, invasion effects and near wellbore formation parameters. Control and processing unit 154 receives control signals from the Earth's surface. Control and processing unit 154, in turn, applies the appropriate control signal to the electromagnet transmitter/receivers and to the electrodes. Control and processing unit 154 controls which of the electromagnetic transmitter/receivers and which of the electrodes serve as the transmitter at any given time and which serve as receivers.

Control and processing unit 154 also transmits control signals to and receives data signals from an auxiliary control and processing unit 155 in each of the auxiliary units 62. Auxiliary control and processing unit 155 in turn applies the appropriate control signals to the electromagnet transmitter/receivers and to the electrodes in the auxiliary units to either transmit or receive the appropriate signals. The auxiliary control and processing unit 155 also controls reception of seismic signals by seismic detectors 58. Communication between the central unit 60 and the auxiliary units 62 is normally digital with each auxiliary unit having a unique address. Control and processing unit 154 may also perform certain signal processing, including but not limited to transmitter and system response corrections, noise filtering, data averaging and signal-to-noise improvement.

In the system shown in FIG. 8, the electromagnetic transmitter/receivers and electrodes may be utilized to generate and to detect signal in a plurality of different modes. As used herein, the term "time domain" refers to measurements made using an excitation signal in which current is abruptly switched, thereby producing a transient signal. For time domain excitation, the excitation signal will typically be either a square wave, or a pulsed or triangular wave, or a pseudo random binary sequence (PBRS) signal. A "frequency domain" measurement normally utilizes a sine wave excitation signal.

Examples of different modes in which measurements may be made by the instrument include but are not limited to the following:

Mode 1: A time domain measurement in which a signal is generated by an electromagnetic transmitter (3 components x, y, z) and detected by an electromagnetic receiver (3 components x,y,z). This measurement is mainly sensitive to the conductivity of the conductive strata of the formation.

Mode 2: A time domain measurement in which a signal is generated by an electric dipole (z direction only) and detected by an electromagnetic receiver (3 components x, y, z). This measurement has mixed sensitivity to conductive and resistive portions of the formation. This measurement is sensitive to the resistivity of the formation because the generated signal is a time domain (transient) signal generated by an electric dipole. The measurement is sensitive to conductivity of the formation because the signal is sensed by an electromagnetic receiver which is sensitive to a magnetic field which is proportional to current flow in the formation.

Mode 3: A time domain measurement in which a signal is generated by an electric dipole (z direction only) and detected by an electric dipole receiver (3 components x, y, z). This measurement is mainly sensitive to the resistive formation.

Mode 4: A time domain measurement in which a signal is generated by an electromagnetic transmitter (3 components x, y, z) and detected by an electric dipole (3 components x, y, z). This measurement provides information which is substantially the same information as provided by the Mode 2 measurement, but may be performed for redundancy. This measurement is sensitive to the conductivity of the formation because the generated signal is a time domain (transient) signal generated by the electromagnetic transmitter. The measurement is sensitive to resistivity of the formation because the signal is sensed by a dipole receiver which is sensitive to the voltage resulting from current flow.

In a particular application of the system shown in FIG. 8, resistivity of the Earth formations surrounding the wellbore are measured using the system configured substantially as shown and explained with reference to FIGS. 2 through 7. It is contemplated that the measurements made using the system according to FIGS. 2 through 7 will be made using electrodes spaced to provide an axial resolution of on the order of 1 to 5 meters. Concurrently or sequentially, measurements of Earth formation resistivity may be made using the instrument configured substantially as shown in FIG. 8 and as explained above to make any combination of time domain electromagnetic measurements (including measuring induced magnetic and electric field properties), frequency domain electromagnetic measurements (including measuring induced magnetic and electric field properties). As will be readily appreciated by those skilled in the art, the instrument in FIG. 8 may be configured to make the foregoing electrical and electromagnetic measurements at relatively low axial resolution (on the order of 10 to 100 meters), using corresponding axial spacing between the ones of the coils and/or electrodes serving as transmitters and those serving as receivers. Using long axial spacing, and resultant axial resolution, will make measurements that have relatively deep lateral (transverse to the longitudinal axis of the instrument and wellbore) investigative properties. It is at these deeper lateral distances from the wellbore that the resistivity of the Earth formations is more likely to be unaffected by penetration (invasion) of drilling fluids from the wellbore. In embodiments wherein the electromagnetic measurements are made in the time domain, the axial resolution of the measurements may be relatively short, as is the case for the galvanic measurements made along the casing and a explained above with reference to FIGS. 1 through 5.

Figure 9:
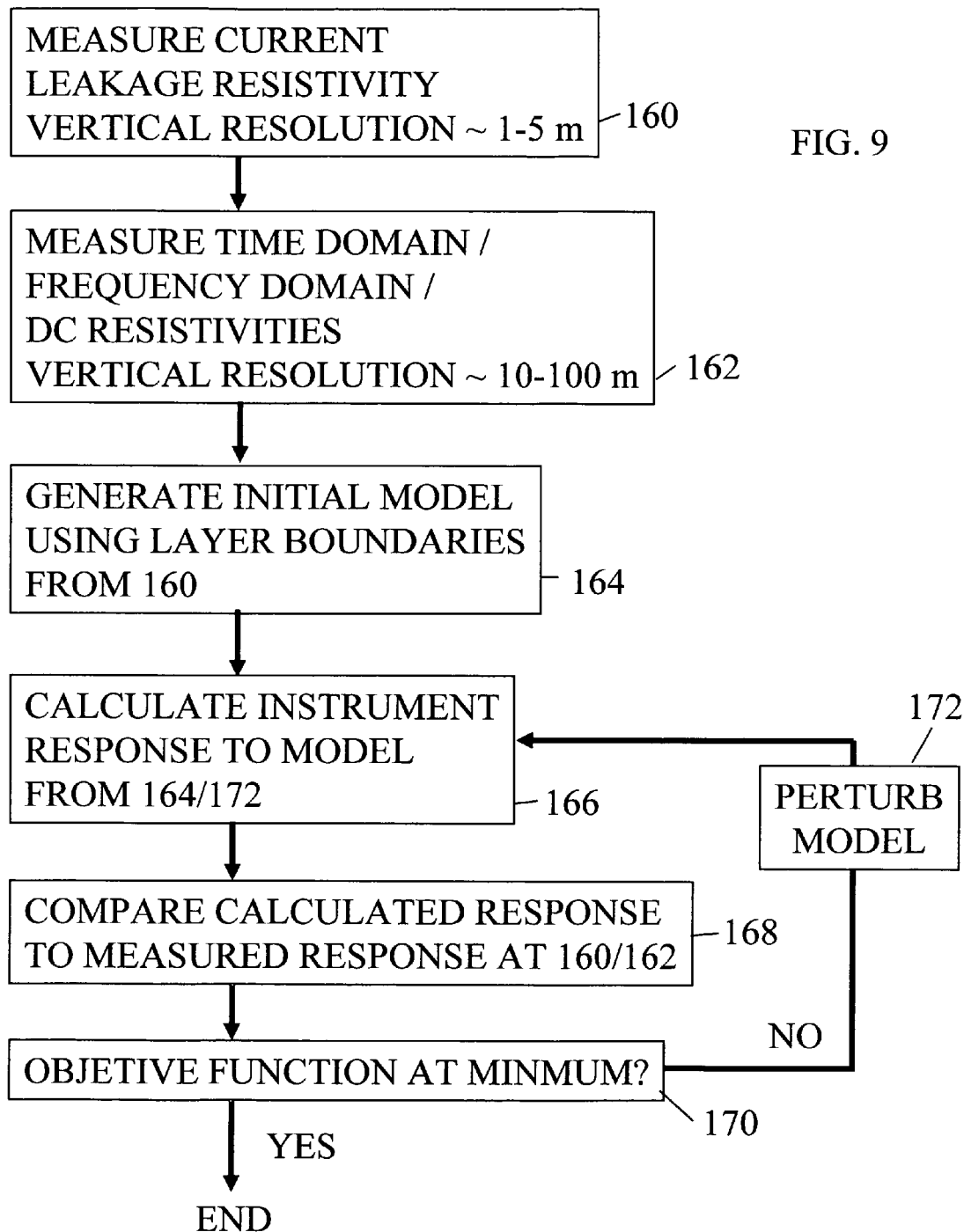
FIG. 9 shows a flow chart of one embodiment of combining galvanic and electromagnetic measurements.

One embodiment of the foregoing process is shown in flow chart form in FIG. 9. At 160, through-casing resistivity measurements are made using the "current leakage" principle, as explained above with reference to FIGS. 2 through 7. Using a system as shown in FIG. 8 (and including the through casing resistivity measurement devices of FIGS. 2 through 7), measurements of laterally "deep" resistivity of the formations are made using electromagnetic measurements at low axial resolution, as shown at 162. At 164, an initial model of the spatial distribution of resistivities is made. Typically, layer boundaries will be selected from the current leakage (through casing) resistivity measurements because they have higher axial resolution. Uninvaded (deep) resistivity values will be selected from the "deep" electromagnetic measurements. At 166, the expected response of both the deep system and the current leakage system is calculated with respect to the initial model. At 168, the calculated response is compared to the actual measurements from the various instruments. At 170, the comparison determines whether a minimum difference has been reached, or as shown at 170, whether a value of an objective function has reached a minimum. If yes, the process is completed, and the model is determined to be the most likely spatial distribution of resistivity values. If not, at 172, the model is perturbed, and the process is repeated from the calculation of expected instrument response at 166. Using the above technique can provide good analysis of spatial distribution of formation resistivities from within a cased wellbore.

Figure 10:
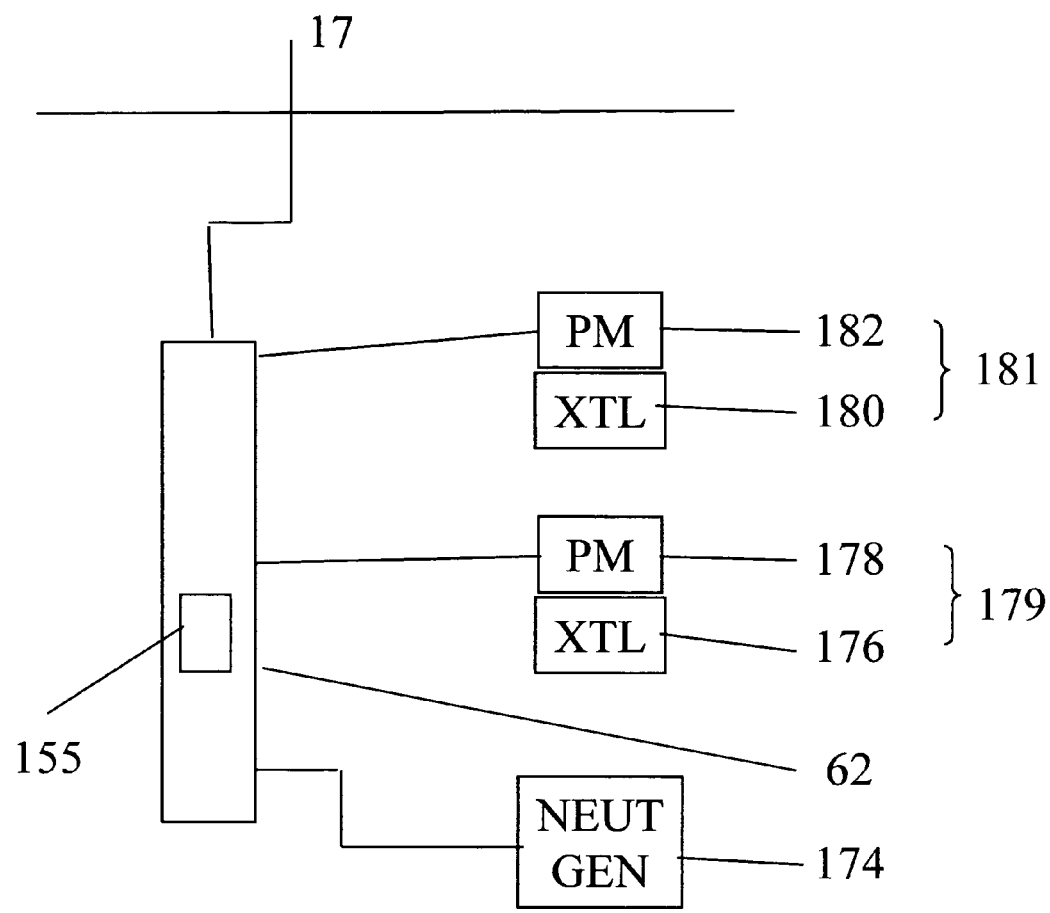
FIG. 10 shows a particular embodiment of satellite unit which includes nuclear radiation measurement devices therein.

Another embodiment of the auxiliary unit 62 is shown in FIG. 10. The embodiment of FIG. 10 includes processing, telemetry and control circuits 155 as in the previous embodiments, e.g, such as shown in FIG. 8. The embodiment in FIG. 10 includes nuclear radiation sensing devices to enable measurements corresponding to various compositional properties of the Earth formations surrounding the wellbore. Such measurements may enable an initial estimate of formation resistivity, fractional volume of pore space (porosity), and an estimate of whether any hydrocarbons present in the Earth formations are in the form of liquid and/or gas. The sensing device includes a pulsed-type neutron generator tube 174 that emits controlled duration "bursts" of neutrons having an energy on the order of 14 million electron volts (MeV). The timing and duration of such neutron bursts may be controlled by the controller 155. At spaced apart positions within the housing of the auxiliary unit are two or more radiation detectors 179, 181. In the present embodiment, each of the radiation detectors comprises a scintillation detector crystal 176, 180, which may be thallium-doped sodium iodide, or similar material known in the art for detecting nuclear radiation. Other materials known in the art for the crystals 176, 180 include cerium-doped gadolinium oxyotrhosilicate. See, e.g., U.S. Pat. No. 5,521,378 issued to Roscoe et al. The material used for the crystals 176, 180 is not intended to limit the scope of the invention. Each scintillation crystal 176, 180 is coupled to a respective photomultiplier tube 178, 182. The output of each tube 178, 182 is coupled to the controller 155. Circuits (not shown separately) in the controller 155 detect electrical impulses generated by each tube 178, 182 and count the impulses as well as measure their respective amplitudes. Measurement of the timing of, number of and amplitudes of the impulses from each tube 178, 182 may be used to infer the porosity of the Earth formations, and the macroscopic neutron capture cross-section of the Earth formations. Some implementations may also infer the mineral composition of the Earth formations from the foregoing impulse analysis. Devices for making such measurements and analysis are known in the art. See, for example, U.S. Pat. No. 6,124,590 issued to Mickael, incorporated herein by reference.

In the embodiment of FIG. 10, initial inferences about the composition and fluid content of the Earth formations can be used to generate an initial estimate of the resistivity of the Earth formations. Such initial estimates may be used, in some embodiments, to constrain the initial mode (160 in FIG. 9). In other embodiments, particularly where the instrument according to the invention is used to monitor movement of fluids in the Earth's subsurface, having the sensing devices as shown in FIG. 10 may enable reducing the number of measurements made by the galvanic (current leakage) resistivity measuring devices of FIGS. 1 through 5. The galvanic measuring devices of FIG. 1 through 5 require that the instrument either be stopped in the wellbore or move at a relatively slow axial speed, thus decreasing the efficiency of the measurement operation. Having the nuclear devices shown in FIG. 10 thus may increase the effective speed by which evaluation of a particular wellbore may be made.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining spatial distribution of resistivity of Earth formations surrounding a wellbore having a conductive pipe therein, comprising:

measuring resistivity of the Earth formations using measurements of current leakage along the pipe at selected axial positions;

measuring electromagnetic properties of the Earth formations from within the pipe, the measurements of electromagnetic properties corresponding to a larger axial distance and to a greater lateral distance than the measurements of resistivity from current leakage;

jointly inverting the current leakage and electromagnetic measurements to obtain a model of the spatial distribution; and storing the model in a computer readable medium.

2. The method of claim 1 wherein the measuring resistivity using measurements of current leakage comprises:

conducting an electrical current between a first selected position in the wellbore through the conductive pipe to a second position along the pipe near the Earth's surface;

digitally sampling a voltage drop measured between a third and fourth selected positions along the pipe between the first and second selected positions;

conducting an electrical current between the first selected position and a fifth selected position near the Earth's surface away from the pipe;

repeating the digitally sampling the voltage drop between the third and fourth position;

determining resistivity of the Earth formation from the digital samples of voltage drop and storing the resistivity in a computer readable medium.

3. The method of claim 2 further comprising moving the first, the second and the third positions, and repeating both the digitally sampling and the repeated digitally sampling.

4. The method of claim 2 further comprising conducting a focusing current from a selected position along the pipe, the focusing current configured to constrain flow of current from the first position to the fifth position along substantially laterally outward paths from the wellbore in the lateral vicinity of the wellbore.

5. The method of claim 4 further comprising controlling a magnitude of the focusing current so that a voltage drop measured axially along the wellbore between selected positions remains substantially zero.

6. The method of claim 2 further comprising controlling a duty cycle of the current flowing from the wellbore to the second and to the fifth positions near the Earth's surface to correspond to an apparent conductivity of Earth formations.

7. The method of claim 2 wherein the digitally sampling is performed at a rate of at least about one thousand times a frequency of the current flowing from the first selected position so as to enable determination of transient effects.

8. The method of claim 2 wherein the conducting an electrical current between the first selected position and the fourth position, and the conducting electrical current between the first position and the fifth position comprises switching polarity of a direct current.

9. The method of claim 8 wherein a frequency of the switching is within a range of about 0.2 to 20 Hertz.

10. The method of claim 8 wherein the switching is performed according to a pseudo random binary sequence.

11. The method of claim 2 wherein the conducting an electrical current between the first selected position and the fourth position, and the conducting electrical current between the first position and the fifth position comprises generating alternating current.

12. The method of claim 11 wherein a frequency of the alternating current is within a range of about 0.2 to 20 Hertz.

13. The method of claim 2 further comprising selecting an axial distance between the second and third positions in response to an expected resistivity of the Earth formations.

14. The method of claim 13 wherein the selecting an axial distance comprises generating an initial model of the Earth formations, estimating a resistivity of the Earth formations from the digitally sampled voltage measurements and selecting the axial distance based on differences between the initial model and the estimated resistivities.

15. The method of claim 2 further comprising selecting an axial distance between the first position and at least one of the second and third positions in response to an expected resistivity of the Earth formations.

16. The method of claim 15 wherein the selecting an axial distance comprises generating an initial model of the Earth formations, estimating a resistivity of the Earth formations from the digitally sampled voltage measurements and selecting the axial distance based on differences between the initial model and the estimated resistivities.

17. The method of claim 15 further comprising passing a focusing current through the pipe at selected axial positions, the axial positions for passing the focusing current selected in response to at least one of the initial model and the differences between the initial model and the estimated resistivities, the focusing current having a flow path selected to constrain the electrical current flowing from the first position substantially to a predetermined geometry.

18. The method of claim 2 wherein the electromagnetic measurements comprise time domain measurements.

19. The method of claim 2 wherein the electromagnetic measurements comprise frequency domain measurements.

20. The method of claim 1 further comprising measuring a nuclear radiation property of the Earth formations, deriving an inference of at least one of composition of, fluid content of and fractional volume of pore space of the Earth formations; and storing the inference in a computer readable medium.

21. The method of claim 20 wherein the nuclear radiation property comprises macroscopic neutron capture cross section.

* * * * *